United States Patent
Kim et al.

(10) Patent No.: US 11,843,091 B2
(45) Date of Patent: Dec. 12, 2023

(54) SEPARATOR FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Gain Kim, Yongin-si (KR); Yongkyoung Kim, Yongin-si (KR); Yangseob Kim, Yongin-si (KR); Jungyoon Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 411 days.

(21) Appl. No.: 16/558,503

(22) Filed: Sep. 3, 2019

(65) Prior Publication Data
US 2020/0075910 A1    Mar. 5, 2020

(30) Foreign Application Priority Data

Sep. 3, 2018  (KR) .......................... 10-2018-0104744

(51) Int. Cl.
*H01M 10/00* (2006.01)
*H01M 10/0525* (2010.01)
(Continued)

(52) U.S. Cl.
CPC ....... *H01M 10/0525* (2013.01); *H01M 50/42* (2021.01); *H01M 50/426* (2021.01); *H01M 50/449* (2021.01); *H01M 50/457* (2021.01)

(58) Field of Classification Search
CPC ............ H01M 50/411; H01M 50/449; H01M 10/0525; H01M 50/42; H01M 50/426;
(Continued)

(56) References Cited

U.S. PATENT DOCUMENTS

| 2005/0084760 A1 | 4/2005 | Hwang et al. |
| 2011/0045338 A1 | 2/2011 | Bae et al. |

(Continued)

FOREIGN PATENT DOCUMENTS

| CN | 101960659 A | 1/2011 |
| CN | 103890999 A | 6/2014 |

(Continued)

OTHER PUBLICATIONS

Korean Office action dated Nov. 24, 2020.
(Continued)

*Primary Examiner* — Nicholas P D'Aniello
(74) *Attorney, Agent, or Firm* — Lee IP Law, P.C.

(57) ABSTRACT

A separator for a rechargeable lithium battery and a rechargeable lithium battery including the separator, the separator including a porous substrate; and a coating layer on at least one surface of the porous substrate, wherein the coating layer includes organic filler particles, fluorine organic binder particles, and (meth)acryl organic binder particles, an average particle diameter of the organic filler particles is equal to or greater than an average particle diameter of the fluorine organic binder particles, and the fluorine organic binder particles are coated on the porous substrate as a part of the coating layer in an amount of less than about 0.1 g/m² per surface.

10 Claims, 3 Drawing Sheets

(51) Int. Cl.
*H01M 50/449* (2021.01)
*H01M 50/42* (2021.01)
*H01M 50/426* (2021.01)
*H01M 50/457* (2021.01)

(58) Field of Classification Search
CPC ............. H01M 50/457; H01M 50/461; H01M 10/0587; H01M 2220/20; H01M 10/052; H01M 4/623; H01M 10/058; H01M 50/443; H01M 50/491; Y02E 60/10; Y02P 70/50
USPC ........................................................ 429/144
See application file for complete search history.

(56) References Cited

U.S. PATENT DOCUMENTS

| | | |
|---|---|---|
| 2012/0148901 A1 | 6/2012 | Okamoto |
| 2014/0248525 A1 | 9/2014 | Iwai |
| 2014/0363726 A1* | 12/2014 | Honda ................ H01M 50/426 429/145 |
| 2015/0050544 A1 | 2/2015 | Nam et al. |
| 2015/0056491 A1* | 2/2015 | Zhao ................... H01M 50/451 429/144 |
| 2016/0172705 A1 | 6/2016 | Hoshiba |
| 2016/0181669 A1 | 6/2016 | Hoshiba |
| 2017/0163907 A1* | 6/2017 | Connolly ......... H04N 21/23424 |
| 2017/0263907 A1* | 9/2017 | Ameyama ............. C08F 212/08 |
| 2017/0309915 A1 | 10/2017 | Lee et al. |
| 2017/0338460 A1 | 11/2017 | Kim et al. |
| 2017/0338461 A1 | 11/2017 | Seo et al. |
| 2018/0315971 A1 | 11/2018 | Kwon et al. |

FOREIGN PATENT DOCUMENTS

| | | |
|---|---|---|
| CN | 103947009 A | 7/2014 |
| CN | 106104850 A | 11/2016 |
| CN | 106159160 A | 11/2016 |
| CN | 107394087 A | 11/2017 |
| CN | 107394090 A | 11/2017 |
| CN | 107742688 A | 2/2018 |
| JP | 2015-037078 A | 2/2015 |
| JP | 2016-119222 A | 6/2016 |
| JP | 2016-152152 A | 8/2016 |
| KR | 10-2005-0030763 A | 3/2005 |
| KR | 10-2015-0068711 A | 6/2015 |
| KR | 10-2016-0069493 A | 6/2016 |
| KR | 10-2016-0072009 A | 6/2016 |
| KR | 10-2017-0055440 A | 5/2017 |
| KR | 10-2017-0129641 A | 11/2017 |

OTHER PUBLICATIONS

European Search Report dated Feb. 4, 2020.
Chinese Office action dated Nov. 22, 2021.
Chinese Office action dated May 19, 2022.
Chinese Office action dated Oct. 25, 2022.
Chinese Patent Publication of CN Patent Application No. 201910827740.5 dated Apr. 25, 2023.

* cited by examiner

SEPARATOR FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2018-0104744, filed on Sep. 3, 2018, in the Korean Intellectual Property Office, and entitled: "Separator for Rechargeable Lithium Battery and Rechargeable Lithium Battery Including the Same," is incorporated by reference herein in its entirety.

BACKGROUND

1. Field

Embodiments relate to a separator for a rechargeable lithium battery and a rechargeable lithium battery including the same.

2. Description of the Related Art

In order to correspond to down-sizing and high performance of various devices, down-sizing and lightening of a rechargeable battery has been considered. In addition, discharge capacity, energy density, and cycle characteristics of the rechargeable battery may be considered when applied to a field of electric vehicles and the like. In order to correspond to this use, a rechargeable battery may have large discharge capacity, high energy density per unit volume and excellent cycle-life characteristics.

In the rechargeable lithium battery, a separator may be between positive and negative electrodes in order to prevent a short circuit. An electrode assembly including the positive and negative electrodes and the separator between the positive and negative electrodes may be wound to have a jelly-roll shape, and the jelly-roll may be compressed to improve adherence between the positive/negative electrodes and the separator in the electrode assembly.

SUMMARY

The embodiments may be realized by providing a separator for a rechargeable lithium battery, the separator including a porous substrate; and a coating layer on at least one surface of the porous substrate, wherein the coating layer includes organic filler particles, fluorine organic binder particles, and (meth)acryl organic binder particles, an average particle diameter of the organic filler particles is equal to or greater than an average particle diameter of the fluorine organic binder particles, and the fluorine organic binder particles are coated on the porous substrate as a part of the coating layer in an amount of less than about 0.1 g/m² per surface.

The organic filler particles may include a (meth)acrylate compound, a diallyl phthalate compound, polyimide compound, polyurethane compound, a copolymer thereof, or a combination thereof.

The organic filler particles may be a cross-linked polymer.

A ratio of the average particle diameter of the organic filler particles and the average particle diameter of the fluorine organic binder particles may be about 1:1 to about 2:1.

The average particle diameter of the organic filler particles may be about 0.15 μm to about 3 μm.

The average particle diameter of the organic filler particles may be about 0.2 to about 0.5 μm.

The fluorine organic binder particles may include a homopolymer of a vinylidene fluoride monomer, or a copolymer of a vinylidene fluoride monomer and another monomer.

The average particle diameter of the fluorine organic binder particles may be about 100 nm to about 400 nm.

The fluorine organic binder particles may be a polyvinylidene fluoride-hexafluoropropylene (PVdF-HFP) copolymer and may include about 1 mol % to about 12 mol % of a hexafluoropropylene repeating unit.

The (meth)acryl organic binder particles may include a repeating unit of a (meth)acrylate or a (meth)acrylic acid.

The fluorine organic binder particles and the (meth)acryl organic binder particles may be included in a weight ratio of about 1:99 to about 99:1.

The embodiments may be realized by providing a rechargeable lithium battery including a positive electrode, a negative electrode, and the separator according to an embodiment between the positive electrode and the negative electrode.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
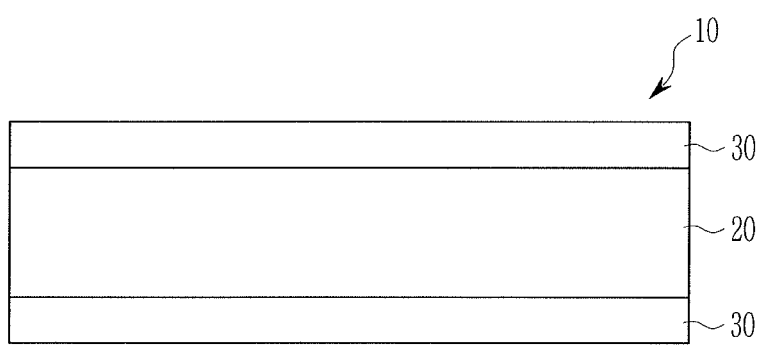
FIG. 1 illustrates a schematic sectional view of a separator for a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, "combination thereof" refers to a mixture, a copolymer, a blend, an alloy, a composite, a reaction product of components.

In the present specification, "(meth)acryl" refers to acryl or methacryl.

Hereinafter, a separator for a rechargeable lithium battery is described below. FIG. 1 illustrates a view showing a cross-section of a separator for a rechargeable lithium battery according to an embodiment. Referring to FIG. 1, a separator 10 for a rechargeable battery according to an embodiment may include a porous substrate 20 and a coating layer 30 on only one surface or on both surfaces of the porous substrate 20.

The porous substrate 20 may have a plurality of pores, and may include a suitable porous substrate for an electrochemical device. Examples of the porous substrate 20 may include a polymer film formed of a polymer, or a copolymer or a mixture of two or more selected from polyolefin such as polyethylene, polypropylene, and the like, a polyester such as polyethylene terephthalate, polybutylene terephthalate, and the like, polyacetal, polyamide, polyimide, polycarbonate, polyetheretherketone, polyaryletherketone, polyetherimide, polyamideimide, polybenzimidazole, polyether sulfone, polyphenylene oxide, a cyclic olefin copolymer, polyphenylene sulfide, polyethylene naphthalate, a glass fiber, Teflon, and polytetrafluoroethylene.

The porous substrate 20 may be, e.g., a polyolefin substrate, and the polyolefin substrate may help improve safety of a battery due to its improved shut-down function. The polyolefin substrate may include, e.g., a polyethylene single film, a polypropylene single film, a polyethylene/polypropylene double film, a polypropylene/polyethylene/polypropylene triple film, or a polyethylene/polypropylene/polyethylene triple film. In an implementation, the polyolefin substrate may include a non-olefin resin in addition to an olefin resin or a copolymer of olefin and a non-olefin monomer.

The porous substrate 20 may have a thickness of about 1 μm to about 40 μm, e.g., about 1 μm to about 30 μm, about 1 μm to about 20 μm, about 5 μm to about 15 μm, or about 10 μm to about 15 μm.

The coating layer 30 according to an embodiment may include, e.g., organic filler particles, fluorine organic binder particles (e.g., a fluorine-containing organic binder particle or fluorine-based organic binder particle), and (meth)acryl organic binder particles (e.g., a (meth)acryl-containing organic binder particle or a (meth)acryl-based organic binder particle). For example, the organic filler particles may be different from the (meth)acryl organic binder particles.

The organic filler particle may help realize uniform thin film coating and may be advantageous in terms of permeability, heat resistance, and insulation compared with an inorganic filler particle.

For example, the organic filler particle may play a role of a support in the separator 10. For example, at a high temperature, the organic filler particle may support the separator 10 and help suppress contraction of the separator 10. In addition, the coating layer 30 on the separator 10 may include the organic filler particle and may help secure sufficient porosity and improve mechanical characteristics. For example, a rechargeable lithium battery including the separator 10 including the organic filler particle may improve safety.

The organic filler particle may include, e.g., a (meth) acrylate compound (or a derivative thereof), a diallyl phthalate compound (or a derivative thereof), a polyimide compound (or a derivative thereof), a polyurethane compound (or a derivative thereof), a copolymer thereof, or a combination thereof.

The organic filler particle may be a cross-linked polymer. For example, the organic filler particle may include a cross-linked polystyrene particle and a cross-linked polymethyl(meth)acrylate particle. The cross-linked polymer may exhibit improved heat resistance and may effectively help suppress contraction of a porous substrate at a high temperature.

An average particle diameter of the organic filler particle may be greater than or equal to about 0.15 μm, e.g., greater than or equal to about 0.2 μm, and less than or equal to about 3 μm, e.g., less than or equal to about 2.5 μm, less than or equal to about 2 μm, less than or equal to about 1.5 μm, less than or equal to about 1 μm, less than or equal to about 0.7 μm, or less than or equal to about 0.5 μm. When the average particle diameter of the organic filler particle is within the ranges, a thickness of the separator 10 may be reduced by forming the thin film coating layer 30 having a uniform thickness, and appropriate porosity may be provided.

The average particle diameter of the organic filler particle may be the same as or larger than an average particle diameter of the fluorine organic binder particle. A ratio of the average particle diameter of the organic filler particle and the average particle diameter of the fluorine organic binder particle may be about 1:1 to about 2:1, e.g., about 1.1:1 to about 1.5:1. Within the ranges, excellent adherence to the electrode may be obtained, resistance inside a cell may not be increased, and battery efficiency may be excellently maintained.

The organic filler particle may have a thermal decomposition temperature of greater than or equal to about 200° C., e.g., about 200° C. to about 500° C.

In an implementation, the organic filler particle may have a core-shell structure. The core-shell structure may include a core portion and a shell portion, wherein the shell portion is greater than or equal to about 50 wt %, based on a total weight of the core portion and the shell portion. The core portion may include the aforementioned organic filler particle and a material melt at a predetermined temperature and having a shut-down function.

A material included in the shell may be a thermoplastic resin having a melting point (Tm) of less than or equal to about 130° C. In an implementation, the material may include polyethylene (PE), polyvinylchloride (PVC), polypropylene (PP), polystyrene (PS), polyacrylonitrile (PAN), styrene-acrylonitrile (SAN), acrylonitrile-butadiene-styrene (ABS), polymethylmethacrylate (PMMA), polytetrafluoroethylene (PTFE), polychlorotrifluoroethylene (PCTFE), or the like.

When the organic filler particle has the core-shell structure, the shell portion of the organic filler particle having a melting point of less than or equal to about 130° C. may melt at a high temperature of greater than or equal to about 130° C., and the melt shell portion may help block gaps (pores) among particles and pores of the separator and grant or help provide a shut-down effect.

In the coating layer 30, the fluorine organic binder particle may act as an electrode adhesive. In an implementation, the fluorine organic binder particle may include, e.g., a vinylidene fluoride polymer. In an implementation, the vinylidene fluoride polymer may include, e.g., a homopolymer including only a repeating unit of a vinylidene fluoride monomer or a copolymer of a repeating unit of vinylidene fluoride and a repeating unit of another monomer. In an implementation, the copolymer may include, e.g., a repeating unit (first repeating unit) of vinylidene fluoride and at least one repeating unit (second repeating unit) of chlorotrifluoroethylene, trifluoroethylene, hexafluoropropylene, ethylene tetrafluoride, or ethylene monomer. In an implementation, the copolymer may be, e.g., a polyvinylidene fluoride-hexafluoropropylene (PVdF-HFP) copolymer including a repeating unit of a vinylidene fluoride monomer and a repeating unit of a hexafluoropropylene monomer.

The second repeating unit in the copolymer may be present in an amount of about 1 mol % to about 12 mol %, e.g., about 1 mol % to about 10 mol %. In an implementation, in the polyvinylidene fluoride-hexafluoropropylene (PVdF-HFP) copolymer, a hexafluoropropylene repeating unit may be present in a range of about 1 mol % to about 12 mol %, e.g., about 1 mol % to about 10 mol %. Within the ranges, adherence of the fluorine binder particle may be easily controlled.

The copolymer may also be in various forms, e.g. an alternating polymer in which the first repeating unit and second repeating unit are alternately distributed, a random polymer in random distribution of repeating units, or a graft a polymer in which a part of structural units is grafted.

The vinylidene fluoride polymer may have a glass transition temperature of about 40° C. to about 70° C. The glass transition temperature is measured by differential scanning calorimetry. Within the range, adherence to the electrode may be improved significantly and the increase in battery resistance may be prevented.

The vinylidene fluoride polymer may have a weight average molecular weight of about 200,000 g/mol to about 700,000 g/mol, e.g., about 200,000 g/mol to about 600,000 g/mol, or about 300,000 g/mol to about 700,000 g/mol. When the weight average molecular weight of the vinylidene fluoride polymer satisfies the ranges, the separator 10 including the vinylidene fluoride polymer may have excellent adherence. The weight average molecular weight may be polystyrene-reduced average molecular weight measured by gel permeation chromatography.

The vinylidene fluoride polymer may be prepared according to various suitable methods, e.g., emulsion polymerization, suspension polymerization, massive polymerization, solution polymerization, bulk polymerization, or the like.

The average particle diameter of the fluorine organic binder particle may be greater than or equal to about 100 nm, e.g., greater than or equal to about 110 nm, greater than or equal to about 120 nm, or greater than or equal to about 130 nm, and less than or equal to about 400 nm, e.g., less than or equal to about 350 nm, less than or equal to about 300 nm, or less than or equal to about 250 nm. When the average particle diameter of the fluorine organic binder particle is within the ranges, adherence to the electrode may be excellently improved.

When allowed to stand at about 50° C. to about 70° C. for about 70 hours to about 80 hours, the fluorine organic binder particle may be a spherical shaped or sphere-like shaped particle showing a swelling degree of about 200% to 1,000% about or in an electrolyte. Within the ranges, adherence of the separator may not only be improved, but a resistance increase also may be prevented. In addition, the fluorine organic binder particle may not be dissolved in a solvent or dispersion during the preparation of slurry, and a particle shape may be maintained after the coating and thus may minimize permeability deterioration.

The fluorine organic binder particle may have a core-shell structure. The core-shell structure may include a core portion and a shell portion, and the shell portion may be greater than or equal to about 50 wt % based on a total weight of the core portion and the shell portion. The core may include the aforementioned fluorine organic binder particle and a material melt at a predetermined temperature and having a shut-down function.

A material included in the shell of the fluorine organic binder particle may be a thermoplastic resin having a melting point ($T_m$) of less than or equal to about 130° C. In an implementation, the material may be polyethylene (PE), polyvinylchloride (PVC), polypropylene (PP), polystyrene (PS), polyacrylonitrile (PAN), styrene-acrylonitrile (SAN), acrylonitrile-butadiene-styrene (ABS), polymethylmethacrylate (PMMA), polytetrafluoroethylene (PTFE), polychlorotrifluoroethylene (PCTFE), or the like.

When the fluorine organic binder particle has the core-shell structure, the shell of the fluorine organic binder particle having a melting point of about 130° C. or less may melt at a high temperature of greater than or equal to about 130° C., and the melted shell portion may block gaps (pores) among particles and pores of the separator and thus grant a shut-down effect.

In an implementation, the fluorine organic binder particle may be present (e.g., coated on the porous substrate as a part of the coating layer) in an amount of less than about 0.1 g/m², e.g., less than or equal to about 0.099 g/m², or less than or equal to about 0.098 g/m², per surface. In an implementation, the fluorine organic binder particle may be present in an amount of greater than or equal to about 0.030 g/m², e.g., greater than or equal to about 0.040 g/m², greater than or equal to about 0.045 g/m², or greater than or equal to about 0.050 g/m². The amount of the fluorine organic binder particle is based on an amount coated on only one surface of the porous substrate. In the separator 10 according to an embodiment, as the organic filler particle is used in the coating layer 30, the amount of the fluorine organic binder particle may not only be reduced into the ranges, but also excellent adherence may be granted to the separator 10.

The fluorine organic binder particle may be dispersed on the surface of or in the coating layer 30 in an area ratio of greater than or equal to about 5% and less than about 30%, e.g., about 5% to about 20%, or about 5% to about 15%, of a total surface area of the coating layer 30. Within the ranges, electrode adherence of the coating layer 30 may be improved.

The organic filler particle and the fluorine organic binder particle may be included in a weight ratio of about 50:50 to about 90:10, e.g., about 50:50 to about 80:20, or about 50:50 to about 70:30. Within the ranges, the separator may have a thin thickness and also maintain excellent adherence.

In the coating layer 30, the (meth)acryl organic binder particle may help enhance adhesion to the electrode.

The (meth)acryl organic binder particle may include a unit (e.g., repeating unit or moiety) of (meth)acrylate or (meth)acrylic acid.

In the repeating unit of (meth)acrylate or (meth)acrylic acid, the (meth)acrylate may be a conjugate base of (meth) acrylic acid, a (meth)acrylic acid salt, or a derivative thereof. In an implementation, the repeating unit of (meth)acrylate or (meth)acrylic acid may be, e.g., represented by Chemical Formula 1, Chemical Formula 2, Chemical Formula 3, or a combination thereof.

[Chemical Formula 1]

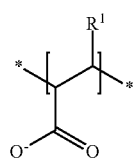

[Chemical Formula 2]

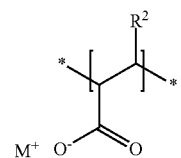

[Chemical Formula 3]

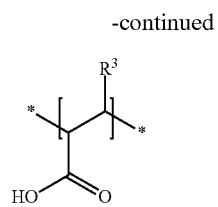

In Chemical Formula 1 to Chemical Formula 3, $R^1$, $R^2$, and $R^3$ may each independently be, e.g., hydrogen or a methyl group.

In Chemical Formula 2, M may be, e.g., an alkali metal. The alkali metal may be, e.g., lithium, sodium, potassium, rubidium, or cesium.

In an implementation, the repeating unit of (meth)acrylate or (meth)acrylic acid may include a repeating unit represented by Chemical Formula 2 and a repeating unit represented by Chemical Formula 3. In an implementation, the repeating unit represented by Chemical Formula 2 and the repeating unit represented by Chemical Formula 3 may be included in a mole ratio of about 10:1 to about 1:2, about 10:1 to about 1:1, or about 5:1 to about 1:1.

The repeating unit of (meth)acrylate or (meth)acrylic acid may be included in an amount of about 10 mol % to about 70 mol %, e.g., about 20 mol % to about 60 mol %, about 30 mol % to about 60 mol %, or about 40 mol % to about 55 mol %, based on a total amount of the (meth)acryl organic binder particle. When the repeating unit of (meth) acrylate or (meth)acrylic acid is included within the ranges, the (meth)acryl organic binder particle may provide the separator 10 having excellent adherence, heat resistance, permeability, and antioxidation.

The fluorine organic binder particle and the (meth)acryl organic binder particle may be included in a weight ratio of about 1:99 to about 99:1, e.g., about 0.6:1 to about 2:1, about 0.8:1 to about 2:1, about 0.9:1 to about 1.5:1, or about 1:1 to about 1.5:1 to secure a binding property with an electrode. Within the ranges, the binding property of the coating layer 30 may be effectively improved.

The coating layer 30 may have a thickness of, e.g., about 0.15 μm to about 20 μm, about 1 μm to about 10 μm, about 1 μm to about 5 μm, or about 1 μm to about 3 μm. Within the ranges, the separator 10 including the coating layer 30 may exhibit excellent adherence.

A thickness ratio of the coating layer 30 relative to that of the porous substrate 20 may be about 0.05 to about 0.5, e.g., about 0.05 to about 0.4, about 0.05 to about 0.3, or about 0.1 to about 0.2. For example, the separator 10 including the porous substrate 20 and the coating layer 30 may exhibit excellent adherence.

The coating layer 30 may further include an inorganic filler particle in addition to the organic filler particle, the fluorine organic binder particle, and the (meth)acryl organic binder particle. The inorganic filler particle may work as a filler along with the organic filler particle and is mixed with the organic filler particle and coated to form a uniform thin film and may help improve heat resistance of the separator 10 and further decrease cell resistance.

The inorganic filler particle may include a metal oxide, a semi-metal oxide, or a combination thereof. For example, the inorganic filler particle may include boehmite, alumina ($Al_2O_3$), $BaSO_4$, MgO, $Mg(OH)_2$, clay, silica ($SiO_2$), titania ($TiO_2$), AlO(OH), $SnO_2$, $CeO_2$, NiO, CaO, ZnO, $ZrO_2$, $Y_2O_3$, $SrTiO_3$, $BaTiO_3$, $MgF_2$, or a combination thereof.

The coating layer 30 may further include an auxiliary binder in addition to the organic filler particle, the fluorine organic binder particle, and the (meth)acryl organic binder particle. The auxiliary binder may include, e.g., styrene, polyvinyl alcohol (e.g., a fluorine-containing polyvinyl alcohol), polyacrylamide, polyvinylpyrrolidone, or the like.

The separator 10 for the rechargeable lithium battery may be manufactured by various suitable methods. For example, the separator 10 for a rechargeable lithium battery may be, e.g., formed by coating a composition for a coating layer on one surface or both surfaces of the porous substrate 20 and then, drying it. The composition for the coating layer may include the organic filler particle, the fluorine organic binder particle, and the (meth)acryl organic binder particle, and optionally the inorganic filler particle and/or the auxiliary binder, and a solvent.

The solvent may be a suitable solvent that dissolves or disperses the organic filler particle, fluorine organic binder particle, (meth)acryl organic binder particle and optionally inorganic filler particle and/or auxiliary binder. The solvent may be, e.g., a low boiling point solvent having a boiling point of less than or equal to about 80° C. In an implementation, the solvent may include, e.g., water, acetone, methylethylketone, ethylisobutylketone, tetrahydrofuran, dimethylformaldehyde, cyclohexane or a mixed solvent thereof.

In an implementation, the coating may be, e.g., a spin coating, a dip coating, a bar coating, a die coating, a slit coating, a roll coating, an inkjet printing, and the like.

In an implementation, the drying may be, e.g., performed through natural drying, drying with warm air, hot air, or low humid air, vacuum-drying, or irradiation of a far-infrared ray, an electron beam, or the like. The drying may be, e.g., performed at a temperature of about 25° C. to about 120° C.

The separator 10 for a rechargeable lithium battery may be manufactured by lamination, coextrusion, and the like in addition to the above method.

Hereinafter, a rechargeable lithium battery including the aforementioned separator for a rechargeable battery is described.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shapes. In addition, it may be bulk type and thin film type depending on sizes.

Figure 2:
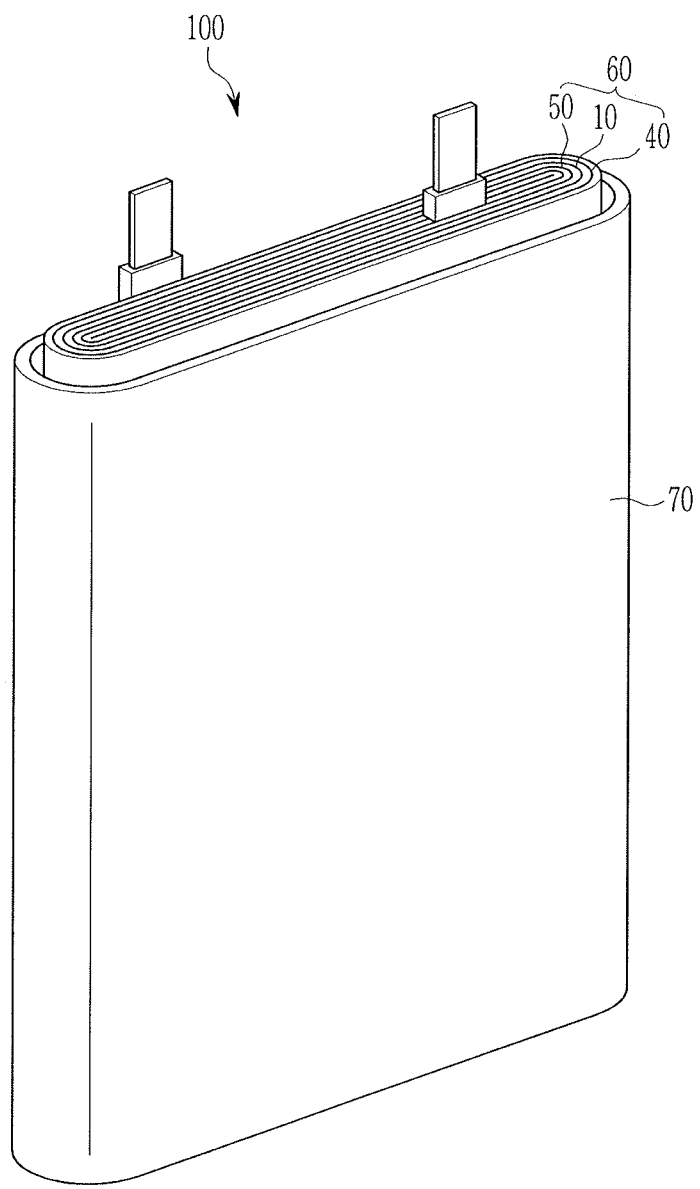
FIG. 2 illustrates an exploded perspective view of a rechargeable lithium battery according to an embodiment.

Herein, as an example of a rechargeable lithium battery, a prismatic rechargeable lithium battery is for example described. FIG. 2 illustrates an exploded perspective view showing a rechargeable lithium battery according to an embodiment. Referring to FIG. 2, a rechargeable lithium battery 100 according to one embodiment may include an electrode assembly 60 manufactured by disposing a separator 10 between a positive electrode 40 and a negative electrode 50 and winding them, and a case 70 housing the electrode assembly 60.

The electrode assembly 60 may have, e.g., a jelly-roll shape formed by winding the positive electrode 40, the negative electrode 50, and the separator 10 therebetween.

The positive electrode 40, the negative electrode 50, and the separator 10 may be impregnated in an electrolyte.

The positive electrode 40 may include a positive current collector and a positive active material layer formed on the positive current collector. The positive active material layer may include a positive active material, a binder, and optionally a conductive material.

In an implementation, the positive current collector may include, e.g., aluminum, nickel, or the like.

The positive active material may use a compound capable of intercalating and deintercalating lithium. For example, at least one of a composite oxide or a composite phosphate of a metal selected from cobalt, manganese, nickel, aluminum, iron, or a combination thereof and lithium may be used. For example, the positive active material may be a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder may help improve binding properties of positive active material particles with one another and with a current collector, and examples may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurea, polytetrafluoroethylene, polyvinylidene fluoride, polyethylene, polypropylene, a styrene-butadiene rubber, an acrylated styrene-butadiene rubber, an epoxy resin, nylon, and the like. These may be used alone or as a mixture of two or more.

The conductive material may help improve conductivity of an electrode. Examples thereof may include natural graphite, artificial graphite, carbon black, a carbon fiber, a metal powder, a metal fiber, and the like. These may be used alone or as a mixture of two or more. The metal powder and the metal fiber may use a metal of copper, nickel, aluminum, silver, or the like.

The negative electrode 50 may include a negative current collector and a negative active material layer formed on the negative current collector.

In an implementation, the negative current collector may include, e.g., copper, gold, nickel, a copper alloy, or the like.

The negative active material layer may include, e.g., a negative active material, a binder, and optionally a conductive material. The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is a suitable carbon negative active material, and examples thereof may include crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may include soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y' alloy, Sn, $SnO_2$, a Sn—C composite, a Sn—Y' alloy, and the like, and at least one of these may be mixed with $SiO_2$. Specific examples of the element Y' may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode 50 may be the same as the binder and conductive material of the positive electrode 40.

The positive electrode 40 and the negative electrode 50 may be manufactured by mixing each active material composition including each active material and a binder, and optionally a conductive material in a solvent, and coating the active material composition on each current collector. In an implementation, the solvent may be, e.g., N-methylpyrrolidone or the like.

The electrolyte may include an organic solvent a lithium salt.

The organic solvent serves as a medium for transmitting ions taking part in the electrochemical reaction of a battery. Examples thereof may include a carbonate solvent, an ester solvent, an ether solvent, a ketone solvent, an alcohol solvent, and an aprotic solvent. The carbonate solvent may be dimethyl carbonate, diethyl carbonate, dipropyl carbonate, methylpropyl carbonate, ethylpropyl carbonate, methylethyl carbonate, ethylene carbonate, propylene carbonate, butylene carbonate, and the like, and the ester solvent may be methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ether solvent may be dibutyl ether, tetraglyme, diglyme, dimethoxyethane, 2-methyltetrahydrofuran, tetrahydrofuran, and the like, and the ketone solvent may be cyclohexanone, and the like. The alcohol solvent may be ethanol, isopropyl alcohol, and the like, and the aprotic solvent may be nitriles such as R—CN (R is a C2 to C20 linear or branched or cyclic hydrocarbon group, a double bond, an aromatic ring, or an ether bond), and the like, amides such as dimethyl formamide, dioxolanes such as 1,3-dioxolane, sulfolanes, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the rechargeable lithium battery, and improves lithium ion transportation between positive and negative electrodes therein. Examples of the lithium salt may include, e.g., $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (x and y are natural numbers), LiCl, LiI, $LiB(C_2O_4)_2$, or a combination thereof.

The lithium salt may be used in a concentration ranging from about 0.1 M to about 2.0 M. When the lithium salt is included within the concentration range, an electrolyte may have excellent performance and lithium ion mobility due to optimal electrolyte conductivity and viscosity.

Hereinafter, the above aspects of the present disclosure are illustrated in more detail with reference to examples.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES AND COMPARATIVE EXAMPLES: MANUFACTURE OF SEPARATOR

Example 1

59 parts by weight of cross-linked polymethylmethacrylate as organic filler particles (MXC-200W, NIPPON SHOKUBAI Co., Ltd., having an average particle diameter of 0.23 μm), 22 parts by weight of PVdF (RC10278, Arkema, having an average particle diameter of 0.23 μm) as fluorine organic binder particles, and 17 parts by weight of polymethylmethacrylate (BM2500M, ZEON) as (meth) acryl organic binder particles were mixed with 1 part by weight of a fluorine polyvinyl alcohol (PVA, Kuraray) binder to prepare a composition for a coating layer.

The composition for a coating layer was gravure-printed on both surfaces of a polyethylene porous substrate (a thickness: 7.5 μm, permeability time: 110 seconds, BDV: 0.85 KV) to manufacture a separator having each coating layer having a thickness of 0.5 μm on each surface of the porous substrate. The coating layers on both surfaces had a thickness of 1.0 μm in total.

When the content of the fluorine organic binder was measured with respect to the separator by using a scanning electron microscope (SEM) image, the amount of the fluorine organic binder particle in each coating layer was 0.099 $g/m^2$.

Example 2

67 parts by weight of cross-linked polymethylmethacrylate (MXC-200W, NIPPON SHOKUBAI Co., Ltd.) as organic filler particles, 12 parts by weight of PVdF (RC10278, Arkema) as fluorine organic binder particles, and 19 parts by weight of polymethylmethacrylate (BM2500M, ZEON) as (meth)acryl organic binder particles were mixed with 1 part by weight of a fluorine polyvinyl alcohol (PVA, Kuraray) binder to prepare a composition for a coating layer.

The composition for a coating layer was used to manufacture a separator according to the same method as Example 1.

When the content of the fluorine organic binder was measured with respect to a separator by using a scanning electron microscope (SEM) image, the amount of the fluorine organic binder particles in each coating layer was 0.098 $g/m^2$.

Comparative Example 1

53 parts by weight of cross-linked polymethylmethacrylate (MXC-200W, NIPPON SHOKUBAI Co., Ltd.) as organic filler particles, 30 parts by weight of PVdF (RC10278, Arkema) as fluorine organic binder particles, and 15 parts by weight of polymethylmethacrylate (BM2500M, ZEON) as (meth)acryl organic binder particles were mixed with 1 part by weight of a fluorine polyvinyl alcohol (PVA, Kuraray) binder to prepare a composition for a coating layer.

The composition for a coating layer was used to manufacture a separator according to the same method as Example 1.

When the content of the fluorine organic binder was measured with respect to a separator by using a scanning electron microscope (SEM) image, the amount of the fluorine organic binder particles in each coating layer was 0.15 $g/m^2$.

Comparative Example 2

76 parts by weight of cross-linked polymethylmethacrylate (MXC-200W, NIPPON SHOKUBAI Co., Ltd.) as organic filler particles and 22 parts by weight of polymethylmethacrylate (BM2500M, ZEON) as (meth)acryl organic binder particles were mixed with 1 part by weight of a fluorine polyvinyl alcohol (PVA, Kuraray) binder to prepare a composition for a coating layer.

The composition for a coating layer was used to manufacture a separator according to the same method as Example 1.

Comparative Example 3

A separator was manufactured according to the same method as Example 1 except that alumina having an average particle diameter of 0.5 μm (D50 with reference to a volume) (AES-11, Sumitomo Chemical Co., Ltd.) as inorganic filler particles was used instead of the organic filler particles.

When the content of the fluorine organic binder was measured with respect to a separator by using a scanning electron microscope (SEM) image, the amount of the fluorine organic binder particles in each coating layer was 0.098 $g/m^2$.

Comparative Example 4

A composition for a coating layer was prepared by mixing 75 parts by weight of 0.4 μm boehmite (BG601, Anhui Estone Materials & Technology Co., Ltd.) as inorganic filler particles, 21 parts by weight of polyvinylpyrrolidone (PVP) as an organic binder, and 4 parts by weight of an acrylate binder (PMMA) having an average particle diameter (D50) of 0.3 μm.

The composition for a coating layer was used to manufacture a separator according to the same method as Example 1.

Examples and Comparative Examples: Manufacture of Rechargeable Lithium Battery Cell Example 3

$LiCoO_2$, polyvinylidene fluoride, and carbon black in a weight ratio of 96:2:2 were added to an N-methylpyrrolidone solvent to prepare a slurry. The slurry was coated on an aluminum thin film and then, dried and compressed to manufacture a positive electrode.

Graphite, polyvinylidene fluoride, and carbon black in a weight ratio of 98:1:1 were added to an N-methylpyrrolidone solvent to prepare a slurry. The slurry was coated on a copper foil and then, dried and compressed to manufacture a negative electrode.

The separator according to Example 1 was disposed between the manufactured positive and negative electrodes and wound to obtain a wound jelly-roll electrode assembly.

The jelly-roll electrode assembly was provided in a battery case, an electrolyte was injected thereinto, and the battery case was sealed to manufacture a rechargeable lithium battery cell.

The electrolyte was prepared by mixing ethylene carbonate, ethylmethyl carbonate, and diethyl carbonate in a volume ratio of 3:5:2 and then, preparing a 1.15 M solution of $LiPF_6$ in the mixed solvent.

Example 4

A rechargeable lithium battery cell was manufactured according to the same method as Example 3 except that the separator of Example 2 was used instead of the separator of Example 1.

Comparative Examples 5 to 8

Rechargeable lithium battery cells were manufactured according to the same method as Example 3 except that the separators of Comparative Examples 1 to 4 were respectively used instead of the separator of Example 1.

Evaluation of Permeability of Separators

The separators according to Examples 1 and 2 and Comparative Examples 1 to 4 were evaluated with respect to permeability.

The permeability indicates time taken for 100 cc of air to respectively pass the separators. The permeability was measured in the following method: three specimens were prepared by respectively cutting the separators at the left, in the middle, and at the right into a size of 50 mm×50 mm, respectively three times measuring time taken for air of 100 cc to pass the separators by using an permeability-measuring device (EG01-55-1MR, Asahi Seiko Co., Ltd.), and respectively averaging three measurements.

Results of Examples 1 and 2 and Comparative Examples 1 and 2 are shown in Table 1.

TABLE 1

| | Permeability (second) | Permeability increase relative to porous substrate |
|---|---|---|
| Example 1 | 125 | Δ15 |
| Example 2 | 121 | Δ11 |
| Comparative Example 1 | 150 | Δ40 |
| Comparative Example 2 | 128 | Δ18 |

Referring to Table 1, the separators according to Examples 1 and 2 exhibited greatly improved permeability, when compared with those of the separators according to Comparative Examples 1 and 2.

Moisture Content Measurement of Separators

Moisture contents of the separators according to Examples 1 and 2 and Comparative Examples 1 to 4 were measured. The moisture contents were measured in a Karl-Fischer method. The results of Examples 1 and 2 and Comparative Examples 3 and 4 are shown in Table 2.

TABLE 2

| | Moisture content (ppm) |
|---|---|
| Example 1 | 295 |
| Example 2 | 293 |
| Comparative Example 3 | 387 |
| Comparative Example 4 | 476 |

Referring to Table 2, the separators according to Examples 1 and 2 exhibited greatly decreased moisture contents compared with those of the separators according to Comparative Examples 3 and 4. Accordingly, cycle-life characteristics of battery cells respectively including the separators according to Examples 1 and 2 are expected to be improved.

Evaluation of Electrode Adherence (Bending Strength) and Break Down Voltage (BDV)

Electrode adherence (bending strength) and a break-down voltage of the separators according to Examples 1 and 2 and Comparative Examples 1 to 4 were measured.

The electrode adherence (bending strength) was evaluated by measuring adherence between an active material layer of a positive electrode and each separator by using a 3-Point Bending (INSTRON) method. Pouch cells after 0.1 C charge and discharge were pressed at 5 mm/min by using a jig to measure a MAX value (N, MPa) from a zero-point to 5 mm of bending.

The break down voltage (BDV) was obtained by respectively putting the separators between SUS plates and then, measuring a voltage where a voltage stopped (break down, short), when the voltage was increased up to 0.3 KV at 8 sec, while a current was fixed at 0.3 mA, by using TOS5301 made by Kikisui Inc. in an AC mode.

The electrode adherence (bending strength) and break down voltage results of the separators according to Examples 1 and 2 and Comparative Examples 2 to 4 are shown in Table 3.

TABLE 3

| | Bending strength (N) | BDV (KV) |
|---|---|---|
| Example 1 | 450 | 1.05 |
| Example 2 | 410 | 1.03 |
| Comparative Example 2 | 350 | 1.01 |
| Comparative Example 3 | 208 | 0.874 |
| Comparative Example 4 | 58 | 0.734 |

Referring to Table 3, the separators according to Examples 1 and 2 exhibited excellent bending strength and break down voltage, when compared with those of the separators according to Comparative Examples 2 to 4.

Cycle-Life Characteristics Evaluation of Rechargeable Lithium Battery Cells

The rechargeable lithium battery cells according to Examples 3 and 4 and Comparative Examples 5 to 8 were charged and discharged in the following method and evaluated with respect to cycle-life characteristics.

Figure 3:
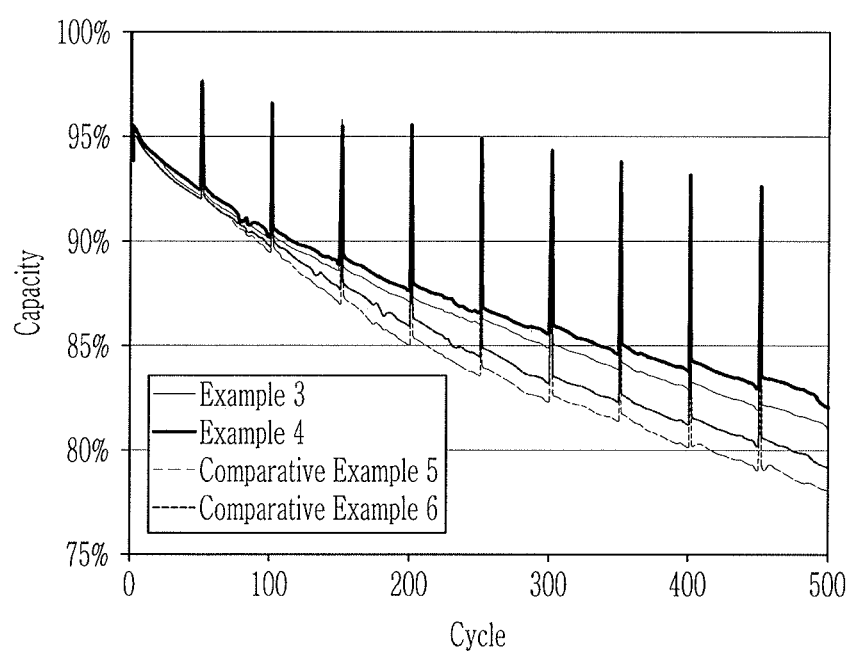
FIG. 3 illustrates a graph showing cycle-life characteristic evaluation results of rechargeable lithium battery cells according to Example 3, Example 4, Comparative Example 5, and Comparative Example 6.

(1) Step 1: 0.2 C/4.4 V/0.02 C cut-off charge, 10 minutes pause, 0.2 C/2.75 V cut-off discharge, and 10 minutes pause; one cycle (2) Step 2: 0.5 C/4.4 V/0.1 C cut-off charge, 10 minutes pause, 1.0 C/3.0 V cut-off discharge, and 10 minutes pause; 49 cycles (3) Steps 1 and 2 were 10 times repeated up to 500 cycles The cycle-life characteristic evaluation results of the rechargeable lithium battery cells according to Examples 3 and 4 and Comparative Examples 5 and 6 are shown in FIG. 3. FIG. 3 illustrates a graph showing cycle-life characteristic evaluation results of the rechargeable lithium battery cells according to Examples 3 and 4 and Comparative Examples 5 and 6. Referring to FIG. 3, the rechargeable lithium battery cells according to Examples 3 and 4 exhibited improved cycle-life characteristics, when compared with the rechargeable lithium battery cells according to Comparative Examples 5 and 6.

By way of summation and review, the separator of the rechargeable lithium battery may include an olefin polymer. The olefin polymer may have excellent flexibility and insufficient impregnation property in an electrolyte due to hydrophobic characteristics and could cause a short circuit of the battery due to rapid thermal contraction at a high temperature of greater than or equal to 100° C.

A separator may be obtained by coating ceramic on one surface of a porous olefin polymer substrate in order to improve strength and heat resistance. The ceramic-coated separator may have low adherence to the negative/positive electrodes, and a volume of the battery could be sharply changed during the charge and discharge and may be easily deformed.

In order to improve the adherence to the positive/negative electrodes, a separator may be manufactured by adding a binder to the ceramic. A separator including the binder additionally added to a ceramic phase could deteriorate the rechargeable lithium battery due to an internal resistance increase because of a porosity decrease, a thickness increase, and swelling of the binder in the electrolyte.

In addition, the ceramic as a coating material may be used as microparticles in order to reduce a coating thickness but may deteriorate a cell cycle-life due to a moisture content increase because of a specific surface area of the microparticles.

A separator according to an embodiment may address the above issues and may have a thin film thickness and excellent adherence to an electrode.

One or more embodiments may provide a separator for a rechargeable lithium battery having improved adherence to the electrode and a thin thickness.

One or more embodiments may provide rechargeable lithium battery having improved cycle-life characteristics and safety.

The separator for a rechargeable lithium battery may have a thin thickness and improved adherence to an electrode, and a rechargeable lithium battery including the same may exhibit improved cycle-life characteristics and safety.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A separator for a rechargeable lithium battery, the separator comprising:
   a porous substrate; and
   a coating layer on at least one surface of the porous substrate,
   wherein:
   the coating layer includes organic filler particles, fluorine organic binder particles, and (meth)acryl organic binder particles, the organic filler particles being different from the (meth)acryl organic binder particles,
   an average particle diameter of the organic filler particles is equal to or greater than an average particle diameter of the fluorine organic binder particles,
   the fluorine organic binder particles are coated on the porous substrate as a part of the coating layer in an amount of 0.030 $g/m^2$ to 0.1 $g/m^2$ per surface,
   the average particle diameter of the organic filler particles is about 0.15 μm to about 3 μm,
   the organic filler particles and the fluorine organic binder are included in a weight ratio of 50:50 to 90:10 and
   a ratio of the average particle diameter of the organic filler particles and the average particle diameter of the fluorine organic binder particles is about 1:1 to about 2:1.

2. The separator as claimed in claim 1, wherein the organic filler particles include a (meth)acrylate compound, a diallyl phthalate compound, polyimide compound, polyurethane compound, a copolymer thereof, or a combination thereof.

3. The separator as claimed in claim 1, wherein the organic filler particles include a cross-linked polymer.

4. The separator as claimed in claim 1, wherein the average particle diameter of the organic filler particles is about 0.2 μm to about 0.5 μm.

5. The separator as claimed in claim 1, wherein the fluorine organic binder particles include:
   a homopolymer of a vinylidene fluoride monomer, or
   a copolymer of a vinylidene fluoride monomer and another monomer.

6. The separator as claimed in claim 1, wherein the average particle diameter of the fluorine organic binder particles is about 100 nm to about 400 nm.

7. The separator as claimed in claim 1, wherein the fluorine organic binder particles include a polyvinylidene fluoride-hexafluoropropylene (PVdF-HFP) copolymer and includes about 1 mol % to about 12 mol % of a hexafluoropropylene repeating unit.

8. The separator as claimed in claim 1, wherein the (meth)acryl organic binder particles include a repeating unit of a (meth)acrylate or a (meth)acrylic acid.

9. A rechargeable lithium battery, comprising:
   a positive electrode,
   a negative electrode, and
   the separator as claimed in claim 1 between the positive electrode and the negative electrode.

10. The separator as claimed in claim 1, wherein the average particle diameter of the organic filler particles is greater than the average particle diameter of the fluorine organic binder particles.

* * * * *